(12) United States Patent
Egawa et al.

(10) Patent No.: US 6,467,925 B2
(45) Date of Patent: Oct. 22, 2002

(54) SPREAD ILLUMINATING APPARATUS

(75) Inventors: Motoji Egawa, Iwata-gun (JP); Shingo Suzuki, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/899,932

(22) Filed: Jul. 9, 2001

(65) Prior Publication Data

US 2002/0006036 A1 Jan. 17, 2002

(30) Foreign Application Priority Data

Jul. 11, 2000 (JP) ........................................ 2000-209756

(51) Int. Cl.[7] ................................................. F21V 7/04
(52) U.S. Cl. ........................ 362/31; 362/330; 362/339; 345/65; 385/901
(58) Field of Search ............................ 362/31, 26, 330, 362/339; 385/901; 349/62, 63, 65

(56) References Cited

U.S. PATENT DOCUMENTS

| | | | | |
|---|---|---|---|---|
| 5,890,791 A | * | 4/1999 | Saito ............................ | 362/31 |
| 6,086,211 A | * | 7/2000 | Ohkawa ........................ | 362/31 |
| 6,164,790 A | * | 12/2000 | Lee ............................... | 362/31 |
| 6,322,225 B1 | * | 11/2001 | Koike ........................... | 362/31 |
| 6,379,016 B1 | * | 4/2002 | Boyd et al. .................... | 362/31 |

FOREIGN PATENT DOCUMENTS

JP   A 11-242223   9/1999

* cited by examiner

*Primary Examiner*—Sandra O'Shea
*Assistant Examiner*—Ali Alavi
(74) *Attorney, Agent, or Firm*—Oliff & Berridge, PLC

(57) ABSTRACT

There is provided a spread illuminating apparatus to suppress leakage of light. Light emitted from a light source, reaching a first inclined surface of grooves of a light reflection pattern and exiting out there is caught by a second inclined surface thereof at an area positioned above the first inclined surface since the distance between an upper edge of the second inclined surface and the level of a bottom thereof is set greater than the distance between an upper edge of the first inclined surface and the level of the bottom thereof. Thus, light, which will leak in case of a conventional art, can reenter a transparent substrate at the second inclined surface so as to improve illumination efficiency.

15 Claims, 3 Drawing Sheets

SPREAD ILLUMINATING APPARATUS

BACKGROUND OF THE INVENTION

1. Field of the Invention

The present invention relates to a spread illuminating apparatus, and more particularly to a spread illuminating apparatus used as an illuminating means for a liquid crystal display.

2. Description of the Related Art

A liquid crystal display operated with small power consumption is characterized by small thickness and light weight, and there is a growing demand for the display mainly for a computer application. Since a liquid crystal, which is a component member of the liquid crystal display, does not emit light by itself, an illuminating means is required for observing an image unlike a light-emitting element such as a CRT. To answer a recent request for reduction in thickness, a spread illuminating apparatus of thin plate side-light type (light-conductive plate type) is extensively used as an illuminating means to illuminate the liquid crystal display.

The applicant of the present invention discloses one embodiment of the spread illuminating apparatus of such a side-light type in the Japanese Patent Application Laid-open No. 11-242222. The spread illuminating apparatus 1 is disposed so as to cover an observation surface F of a reflection type liquid crystal element 51, and a light source lamp 52 is disposed along an end surface 3a of a substantially rectangular transparent substrate 2 with a specified distance therefrom, as illustrated in FIGS. 3 and 4.

A light reflection pattern 12 is formed on an upper surface 11a of the transparent substrate 2 in such a manner that brightness is almost uniform everywhere on the transparent substrate 2 irrespective of the distance from the light source lamp 52. The light reflection pattern 12 comprises a plurality of grooves 13 substantially triangular in section and a plurality of flat portions 14 adjacent to the grooves 13.

The grooves 13 each comprise one inclined surface (hereinafter referred to as "first inclined surface") 30 positioned closer to the light source lamp 52, i.e. closer to one end surface 3a and another inclined surface (hereinafter referred to as "second inclined surface") 40 positioned closer to another end surface 3b opposite to the end surface 3a.

The flat portions 14 are parallel to a lower surface 11b of the transparent substrate 2, and therefore the height of an upper edge 31 of the first inclined surface 30 is equal to the height of an upper edge 41 of the second inclined surface 40 with respect to the lower surface 11b.

In the above-described conventional art, part of light rays 60, which are emitted from the light source lamp 52 and strike the first inclined surface 30, may exit out the transparent substrate 2 passing the first inclined surface 30 as leakage light M failing to contribute to illumination. The ratio of the amount of leakage light to the amount of light entering the transparent substrate 2 is 10 to 20% leading to a considerable decrease of illumination efficiency. Further, the leakage light as described above causes a deterioration in contrast on a display surface.

SUMMARY OF THE INVENTION

The present invention has been made in the light of the above problems, and it is an object of the present invention to provide a spread illuminating apparatus suppressing the leakage of light.

In order to solve the above problems, according to a first aspect of the present invention, there is provided a spread illuminating apparatus in which a transparent substrate made of a light-transmissible material is disposed so as to cover a surface of a member to be illuminated, a bar-like light source is disposed close to one end surface of the transparent substrate and a light reflection pattern comprising a plurality of grooves having a first inclined surface and a second inclined surface, shaped substantially triangular in section, extending parallel to the optical axis of the light source and ranging from the one end surface of the transparent substrate to another end surface opposite to the one end surface and a plurality of flat portions formed between the plurality of grooves is provided on an upper surface of the transparent substrates, wherein an upper edge of the second inclined surface formed closer to the another end surface of the transparent substrate is set to be positioned higher than an upper edge of the first inclined surface formed closer to the one end surface with respect to a predefined datum level, and therefore the flat portions are inclined in such a manner as to descend from the one end surface toward the another end surface.

According to a second aspect of the present invention, in the spread illuminating apparatus of the first aspect, the height defined by the distance between the upper edge of the second inclined surface and the bottom level of the grooves is twice or less as large as the height defined by the distance between the upper edge of the first inclined surface and the bottom level of the grooves.

According to a third aspect of the present invention, in the spread illuminating apparatus of the first or second aspect, the inclination angle of the flat portions with respect to the datum level is 5° or less.

According to a fourth aspect of the present invention, in the spread illuminating apparatus of any one of the first to third aspects, the inclination angle of the first inclined surface with respect to the datum level is 35° to 55° and the inclination angle of the second inclined surface with respect to the datum level is 70° or more.

According to a fifth aspect of the present invention, in the spread illuminating apparatus of any one of the first to fourth aspects, the transparent substrate is formed uniform in thickness as a whole from the one end surface to the another end surface, where the datum level is a virtual plane defined by connecting the upper edges of the first inclined surfaces.

According to a sixth aspect of the present invention, in the spread illuminating apparatus of any one of the first to fourth aspects, the transparent substrate is of a wedge shape as a whole in which the thickness thereof is in inverse proportion to the distance from the one end surface, where the datum level is a virtual plane defined by connecting the upper edges of the first inclined surfaces.

DESCRIPTION OF THE PREFERRED EMBODIMENTS

Figure 1:
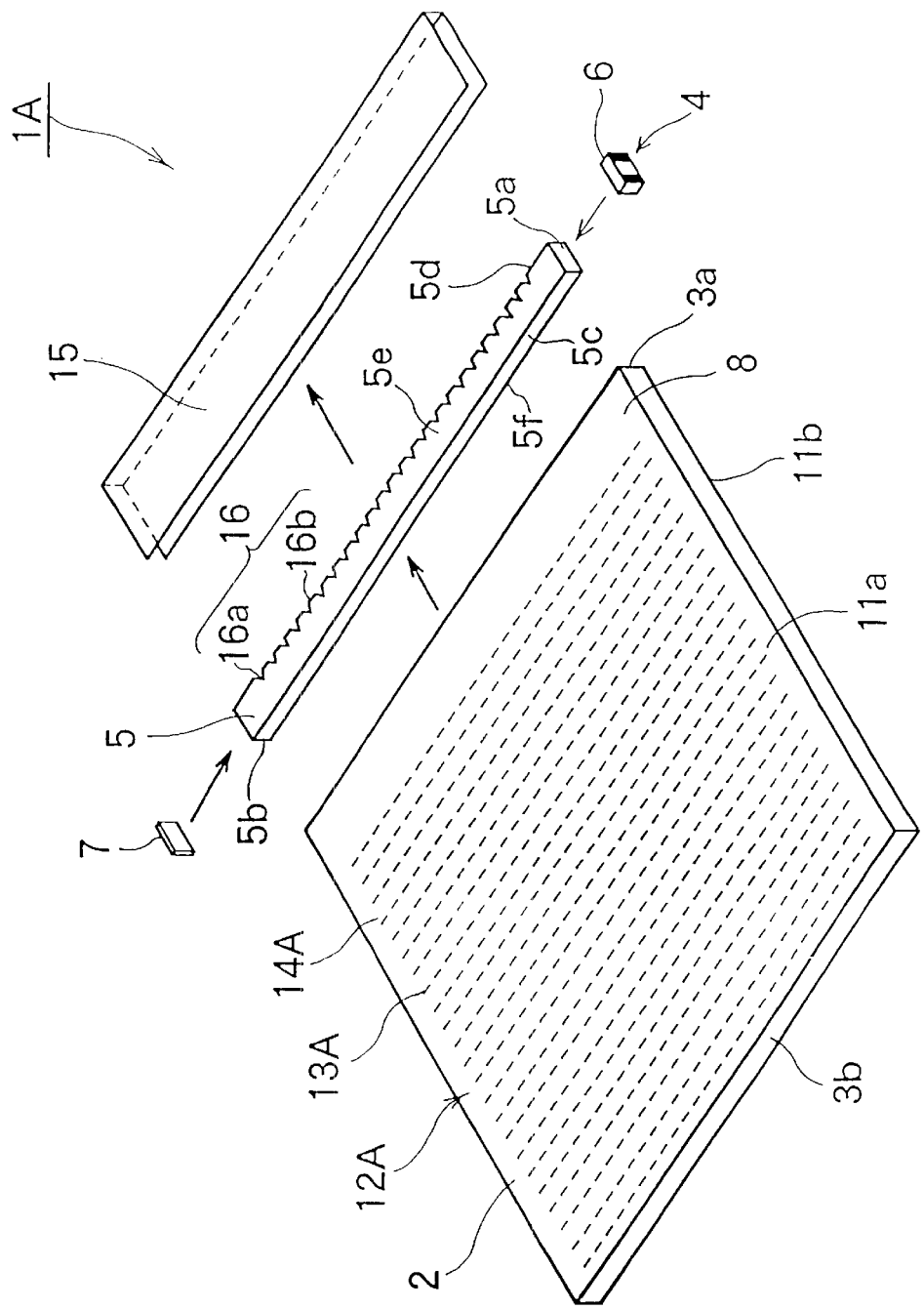
FIG. 1 is an exploded perspective view of a first embodiment of a spread illuminating apparatus according to the present invention.
Figure 2:
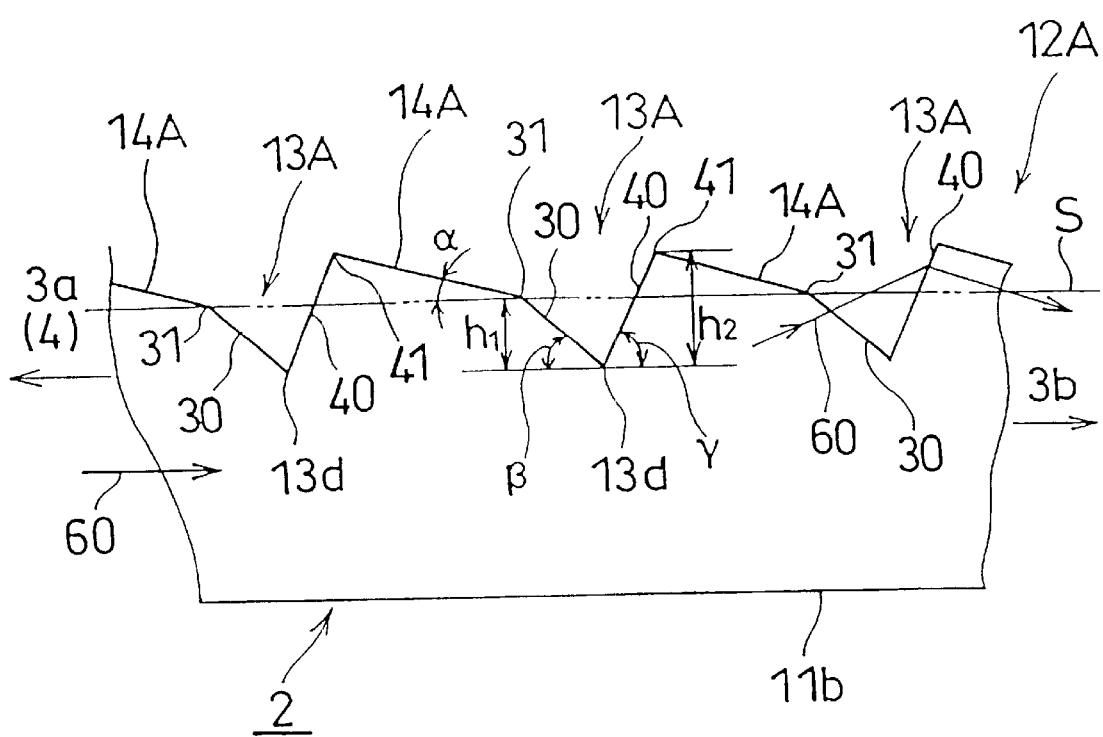
FIG. 2 is a schematic view of a transparent substrate of FIG. 1 and optical paths therein.
Figure 3:
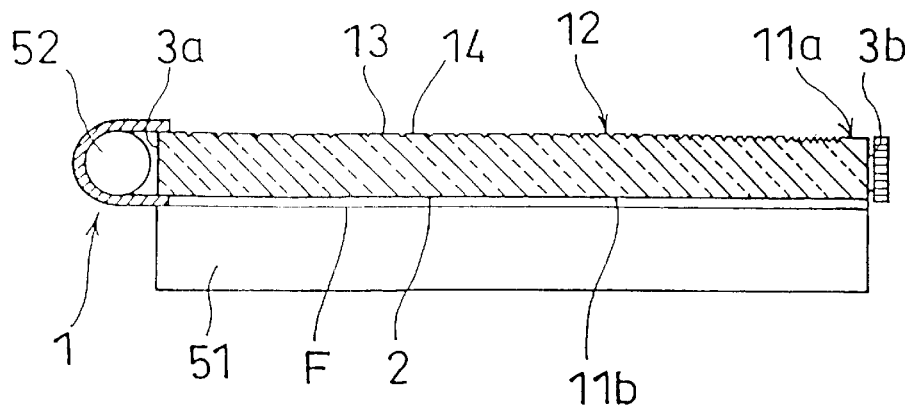
FIG. 3 is a sectional view of an example of a conventional spread illuminating apparatus.
Figure 4:
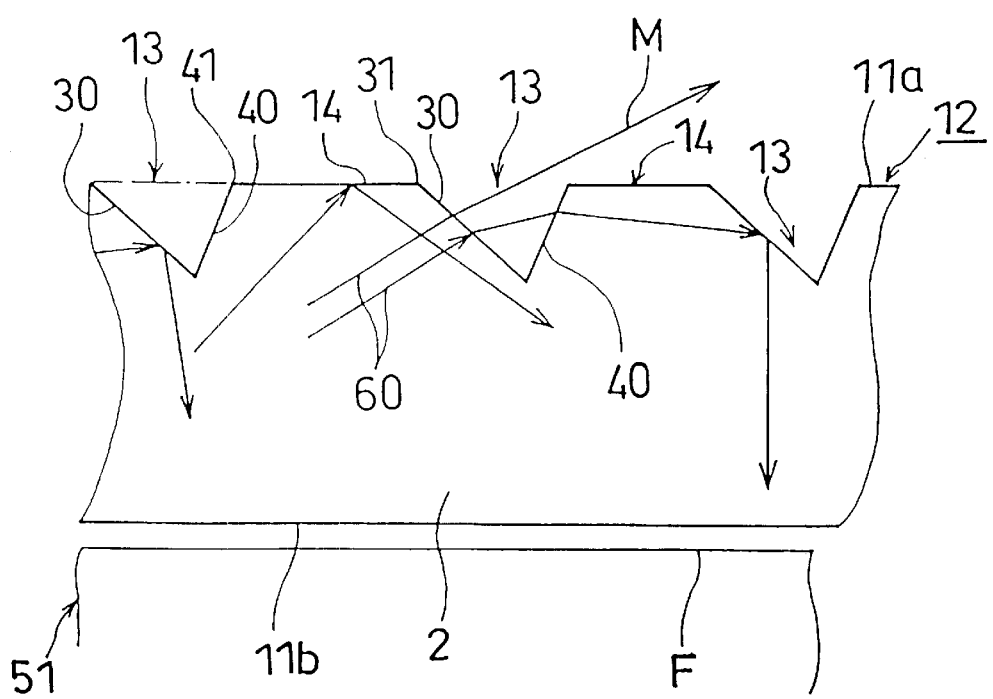
FIG. 4 is a schematic view of optical paths in a transparent substrate of FIG. 3.

A spread illuminating apparatus 1A according to a first embodiment of the present invention will be described with reference to FIGS. 1 and 2. The components and materials identical with or corresponding to those in FIGS. 3 and 4 are represented by the same reference numerals, and detailed description thereof is omitted.

This spread illuminating apparatus 1A generally comprises a substantially rectangular transparent substrate 2 made of a light-transmissible material and a bar-like light source 4 disposed close to one end surface 3a of the transparent substrate 2, and is disposed to cover an observation surface of, for example, a reflection type liquid crystal (not shown) to be used as its auxiliary illumination means.

The transparent substrate 2 is formed uniform in thickness all the way from the end surface 3a to another end surface 3b opposite thereto.

A light reflection pattern 12A is formed on one surface (an observation surface, an upper side in FIG. 1, hereinafter referred to as "upper surface") 11a of two large area surfaces in the transparent substrate 2. Another large area surface (a lower side in FIG. 1) opposite to the upper surface 11a in the transparent substrate 2 is referred to as lower surface 11b.

The light reflection pattern 12A comprises a plurality of grooves 13A substantially triangular in section and a plurality of flat portions 14A adjacent to the grooves 13A and is structured so that the brightness is almost uniform everywhere on the transparent substrate 2 irrespective of the distance from a light conductive member 5. The grooves 13A of the light reflection pattern 12A formed on the transparent substrate 2 are very fine and difficult to visually recognize when observing a screen.

The grooves 13A extend parallel to the optical axis of the light conductive member 5 and are formed in a large number from one end surface 3a through another end surface 3b.

The grooves 13A substantially triangular in section each comprises one inclined surface (first inclined surface) 30 positioned closer to the end surface 3a and another inclined surface (second inclined surface) 40 positioned closer to the end surface 3b with the joining part of the first inclined surface 30 and the second inclined surface 40 defining a bottom 13d thereof.

An upper edge 41 of the second inclined surface 40 is set to be positioned higher than an upper edge 31 of the first inclined surface 30 with respect to a datum level S to be hereinafter described, and the flat portions 14A are each defined by a straight line (not stepped, rugged or curved) connecting the upper edge 41 of the second inclined surface 40 and the upper edge 31 of the first inclined surface 30, and are inclined in such a manner as to descend from the end surface 3a toward the end surface 3b.

In this embodiment, the datum level S is a virtual plane defined by connecting the upper edges 31 of a plurality of the first inclined surfaces 30, where the upper edges 31 coincide with the datum level S meaning that the height of the upper edges 31 of the first inclined surfaces 30 with respect to the datum level S is zero, so the above description "an upper edge 41 of the second inclined surface 40 is set to be positioned higher than an upper edge 31 of the first inclined surface 30 with respect to a datum level S" is equal to "an upper edge 41 of the second inclined surface 40 is set to be positioned higher than an upper edge 31 of the first inclined surface 30." In the present embodiment the datum level is the virtual plane defined by connecting the upper edges 31 of the first inclined surfaces 30, but may be the lower surface 11b of the transparent substrate 2.

The height $h_2$ defined by the distance between the upper edge 41 of the second inclined surface 40 and the level of the bottom 13d is set to be twice or less as large as the height $h_1$ defined by the distance between the upper edge 31 of the first inclined surface 30 and the level of the bottom 13d.

The inclination angle α of the flat portions 14A with respect to the datum level S is 5° or less, the inclination angle β of the first inclined surface 30 is in a range of 35° to 55°, and the inclination angle γ of the second inclined surface 40 is 70° or more.

The light source 4 generally comprises the bar-like light conductive member 5 made of a transparent material and disposed close to and along the end surface 3a of the transparent substrate 2 and a spot-like light source 6 composed of a light emitting diode and disposed facing one end surface 5a of the light conductive member 5. A light reflection plate 7 is disposed facing another end surface 5b of the light conductive member 5.

The light reflection plate 7 may be of a white (disperse white foaming type) plate, a metal evaporating film, etc. The light reflection plate 7 may be replaced with a metal layer formed by directly evaporating a metal (silver, aluminum, etc.) on the end surface 5b of the light conductive member 5, or a paint layer formed by applying a white paint thereon.

A substantially U-shaped frame 15 is provided in such a manner as to cover longitudinal surfaces (a second surface 5d, a third surface 5e and a fourth surface 5f) of the light conductive member 5 except a first surface 5c (a surface facing the transparent substrate) and extends to a part 8 (hereinafter referred to as "transparent substrate proximal portion") positioned toward the end surface 3a of the transparent substrate 2.

An optical path conversion means 16 is provided on the second surface 5d of the light conductive member 5. The optical path conversion means 16 comprises grooves 16a substantially triangular in section and flat portions 16b formed between the grooves 16a.

Light entering the light conductive member 5 and then reflected at the second surface part 5d tends to proceed substantially perpendicular to the first surface 5c when the light is reflected at an inclined surface (not shown) of the grooves 16a. Accordingly, an increased amount of light enters the transparent substrate 2 through the first surface 5c compared to when reflected at the flat portions 16b. Thus, the ratio of the width (occupied area) of the grooves 16a to the width (occupied area) of the flat portions 16b is set to gradually increase in proportion to the increase in distance from the end surface 5a of the light conductive member 5, where the distance from the spot-like light source 6 and the balance of the occupied area of the grooves 16a are taken into consideration so that light can be uniformly emitted from the first surface 5c of the light conductive member though the spot-like light source 6 is disposed on the end surface 5a.

In order to specifically vary the ratio of the occupied area of the grooves 16a to the occupied area of the flat portions 16b as described above, in the optical path conversion means 16 of the present embodiment, the interval (pitch) between any two adjacent grooves 16a is set to be constant while the depth of the grooves 16a is set to gradually increase in proportion to the increase in distance from the spot-like light source 6. Although not shown in Fig., the ratio of the occupied area of the grooves 16a to the occupied area of the flat portions 16b may be varied in such a manner that the interval (pitch) of the grooves 16a gradually decreases toward the end surface 5b while the depth of the grooves 16a is set to be constant.

The frame 15 is made of a rigid material such as aluminum, stainless steel and the like (for example, SUS304), and the thickness thereof is set to a certain value (for example, 0.1 mm). The inner surface of the frame 15 is mirror-finished so as to have a light reflection function.

According to the above-described embodiment, the upper edge 41 of the second inclined surface 40 is positioned higher than the upper edge part 31 of the first inclined surface 30 with respect to the datum level S. Thus, light ray 60 emitted from the light source 4, reaching the first inclined surface 30 and exiting out there can be caught by the second inclined surface 40 at the area positioned above the upper edge 31 of the first inclined surface 30. Light, which will leak outside in case of the conventional art, can reenter the transparent substrate 2 at the second inclined surface 40 so as to contribute to illumination thereby improving illumination efficiency.

As described above, the height $h_2$ defined by the distance between the upper edge 41 of the second inclined surface 40 and the level of the bottom 13*d* is set twice or less as large as the height $h_1$ defined by the distance between the upper edge 31 of the first inclined surface 30 and the level of the bottom 13*d*. The above setting is based on the following:

(1) It was verified from the experiments by the inventor of the present invention that the illumination efficiency can hardly further improve when the height $h_2$ is set to exceed double the height $h_1$; and (2) Problems emerge in machining the transparent substrate 2 when the height $h_2$ exceeds double the height $h_1$.

The inclination angle α is set to 5° or less because when the angle α exceeds 5°, a reduced amount of light reaches the end surface 3*b* of the transparent substrate 2 opposite to the end surface 3*a* positioned close to the light source 4 thereby making it difficult to ensure uniform brightness on the transparent substrate 2.

The inclination angle β is set to be in a range of 35° to 55° while the inclination angle γ is set to 70° or more because the experiments by the inventors of the present invention proved that an excellent illumination efficiency can be obtained with the above-specified angles.

In the above-described embodiment, the transparent substrate 2 has a uniform thickness all the way from the end surface 3*a* to the end surface 3*b*. However, the transparent substrate may be of a wedge shape, where the thickness thereof is in inverse proportion to the distance from the end surface 3*a*. In this configuration, like the above embodiment, the above-described inclination angles α, β and γ are specified with respect to the datum level, e.g. the virtual surface defined by connecting the upper edges of the first inclined surfaces, and at the same time the upper edges of the second inclined surfaces are set to be positioned higher than the upper edges of the first inclined surfaces.

In the above embodiment, one spot-like light source 6 is provided. However, two or more spot-like light sources may be provided.

Also, in the above embodiment, the spot-like light source 6 is disposed to face the one end surface 5*a* of the light conductive member 5 and the light reflection plate 7 is disposed to face the another end surface 5*b* of the light conductive member 5. However, another spot-like light source may be provided in place of the light reflection plate 7. Further, a fluorescent tube may be used as the light source.

Any material can be used for the light conductive member 5 so long as it transmits light efficiently, and an acrylic resin is most suitable because of its light transmissibility and machinability. In place thereof, various kinds of thermoplastic transparent resins including a vinyl chloride resin, a polycarbonate resin, an olefin resin, and a styrene resin can be used. Thermosetting transparent resins including an epoxy resin and an allyl diglycol carbonate resin and inorganic transparent materials such as various kinds of glass materials may be used depending on circumstances.

The light conductive member 5 can be produced by direct machining such as cutting and grinding, or various kinds of molding methods such as casting, heat-pressurizing, extrusion molding, and injection molding. The injection molding method using a resin material is most suitable from the viewpoint of productivity.

The optical path conversion means 16 is formed only on the second surface 5*d* of the light conductive member in the present embodiment. The optical path conversion means 16 can be additionally formed on any of the other surfaces of the light conductive member 5 than the second surface 5*d*, whereby the optical path conversion means 16 covers more extensive area.

In accordance with the present invention, the upper edges of the second inclined surfaces of the grooves are set to be positioned higher than the upper edges of the first inclined surfaces, and light emitted from the light source, reaching the first inclined surface and exiting out there is caught by the second inclined surface at the area positioned above the first inclined surface. Thus, light, which will leak outside in case of the conventional art, can reenter the transparent substrate at the second inclined surface so as to improve illumination efficiency.

What is claimed is:

1. A spread illuminating apparatus in which:

a transparent substrate made of a light-transmissible material is disposed so as to cover a surface of a member to be illuminated;

a bar-like light source is disposed close to one end surface of said transparent substrate; and a light reflection pattern comprising a plurality of grooves having a first inclined surface and a second inclined surface, shaped substantially triangular in section, extending parallel to an optical axis of said light source and ranging from said one end surface of said transparent substrate to another end surface thereof opposite to said one end surface and a plurality of flat portions formed between said plurality of grooves is provided on an upper surface of said transparent substrate, wherein an upper edge of said second inclined surface formed closer to said another end surface of said transparent substrate is set to be positioned higher than an upper edge of said first inclined surface formed closer to said one end surface of said transparent substrate with respect to a predefined datum level, and therefore said flat portions are inclined in such a manner as to descend from said one end surface toward said another end surface.

2. A spread illuminating apparatus according to claim 1, wherein a height defined by a distance between said upper edge of said second inclined surface and a level of a bottom of said groove is twice or less as large as a height defined by a distance between said upper edge of said first inclined surface and said level of said bottom of said groove.

3. A spread illuminating apparatus according to claim 1, wherein an inclination angle of said flat portions with respect to said datum level is 5° or less.

4. A spread illuminating apparatus according to claim 1, wherein an inclination angle of said first inclined surface with respect to said datum level is in a range of 35° to 55°, and an inclination angle of said second inclined surface with respect to said datum level is 70° or more.

5. A spread illuminating apparatus according to claim 1, wherein said transparent substrate is uniform in thickness as a whole from said one end surface to said another end surface, where said datum level is a virtual plane defined by connecting said upper edges of said first inclined surfaces.

6. A spread illuminating apparatus according to claim 1, wherein said transparent substrate is of a wedge shape as a whole in which its thickness is in inverse proportion to a distance from said one end surface, where said datum level is a virtual plane defined by connecting said upper edges of said first inclined surfaces.

7. A spread illuminating apparatus according to claim 2, wherein an inclination angle of said flat portions with respect to said datum level is 5° or less.

8. A spread illuminating apparatus according to claim 2, wherein an inclination angle of said first inclined surface with respect to said datum level is in a range of 35° to 55°, and an inclination angle of said second inclined surface with respect to said datum level is 70° or more.

9. A spread illuminating apparatus according to claim 3, wherein an inclination angle of said first inclined surface with respect to said datum level is in a range of 35° to 55°, and an inclination angle of said second inclined surface with respect to said datum level is 70° or more.

10. A spread illuminating apparatus according to claim 2, wherein said transparent substrate is uniform in thickness as a whole from said one end surface to said another end surface, where said datum level is a virtual plane defined by connecting said upper edges of said first inclined surfaces.

11. A spread illuminating apparatus according to claim 3, wherein said transparent substrate is uniform in thickness as a whole from said one end surface to said another end surface, where said datum level is a virtual plane defined by connecting said upper edges of said first inclined surfaces.

12. A spread illuminating apparatus according to claim 4, wherein said transparent substrate is uniform in thickness as a whole from said one end surface to said another end surface, where said datum level is a virtual plane defined by connecting said upper edges of said first inclined surfaces.

13. A spread illuminating apparatus according to claim 2, wherein said transparent substrate is of a wedge shape as a whole in which its thickness is in inverse proportion to a distance from said one end surface, where said datum level is a virtual plane defined by connecting said upper edges of said first inclined surfaces.

14. A spread illuminating apparatus according to claim 3, wherein said transparent substrate is of a wedge shape as a whole in which its thickness is in inverse proportion to a distance from said one end surface, where said datum level is a virtual plane defined by connecting said upper edges of said first inclined surfaces.

15. A spread illuminating apparatus according to claim 4, wherein said transparent substrate is of a wedge shape as a whole in which its thickness is in inverse proportion to a distance from said one end surface, where said datum level is a virtual plane defined by connecting said upper edges of said first inclined surfaces.

* * * * *